Dec. 27, 1966  A. VISCHER, JR  3,294,548
METHOD OF COOKING FOOD
Filed Sept. 14, 1964  4 Sheets-Sheet 1
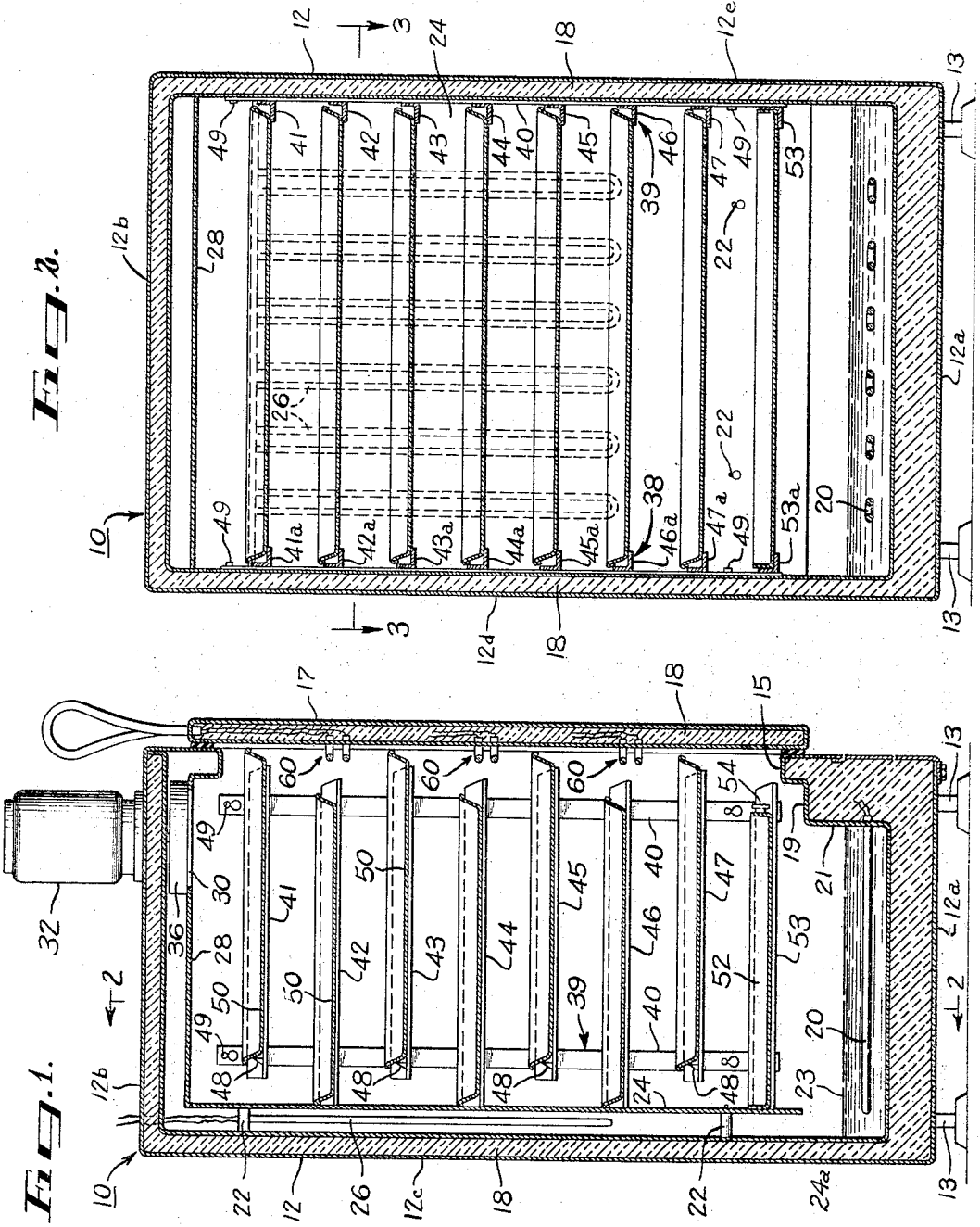
INVENTOR
ALFRED VISCHER, JR.
BY Fidler, Bradley, Patinaude & Setherbridge
Attys.

Dec. 27, 1966     A. VISCHER, JR     3,294,548
METHOD OF COOKING FOOD
Filed Sept. 14, 1964     4 Sheets-Sheet 2
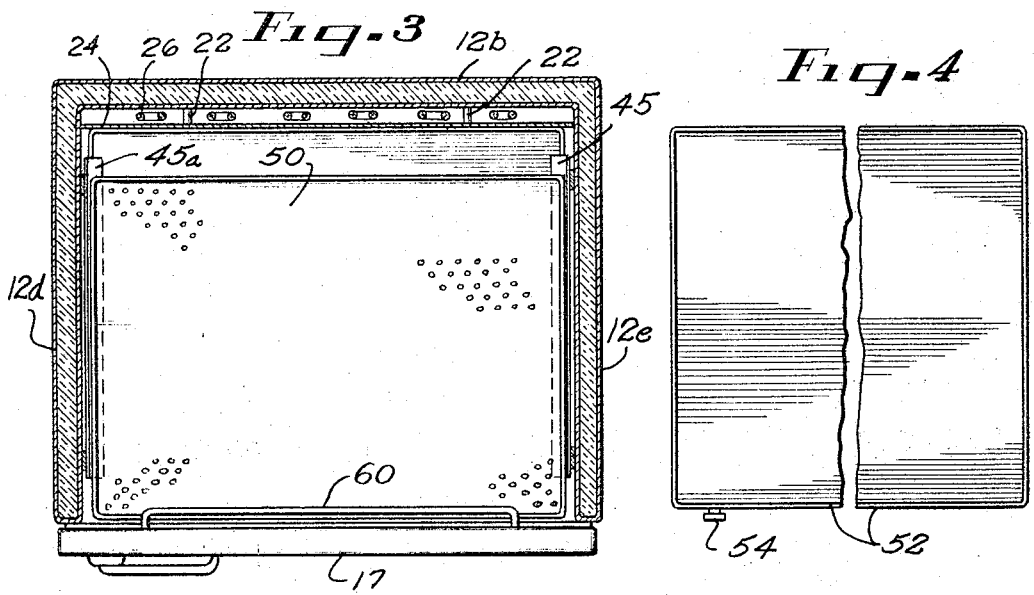
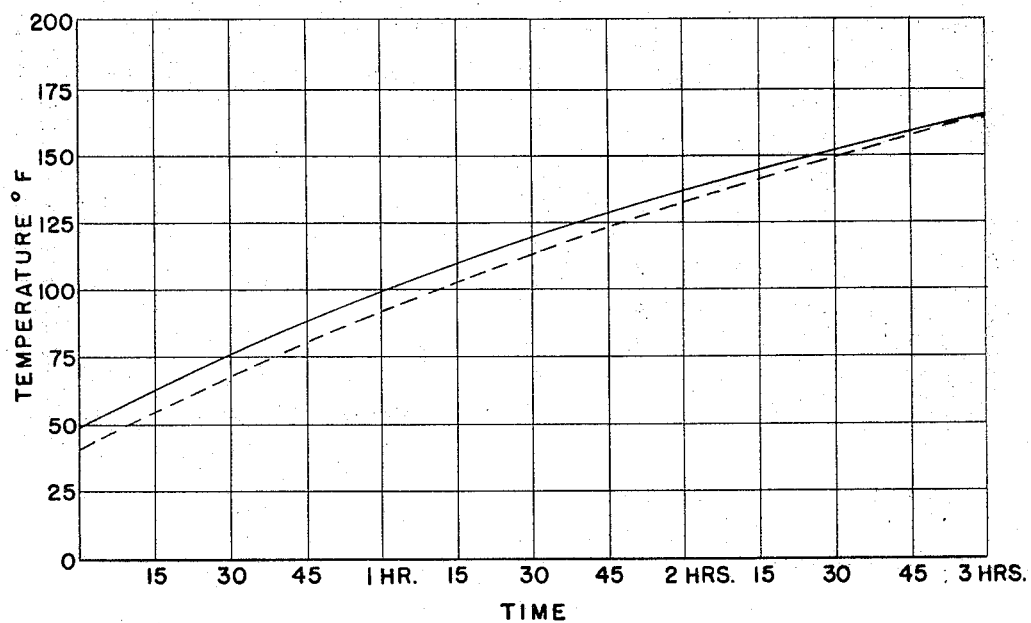
INVENTOR.
Alfred Vischer, Jr.
ATTORNEYS

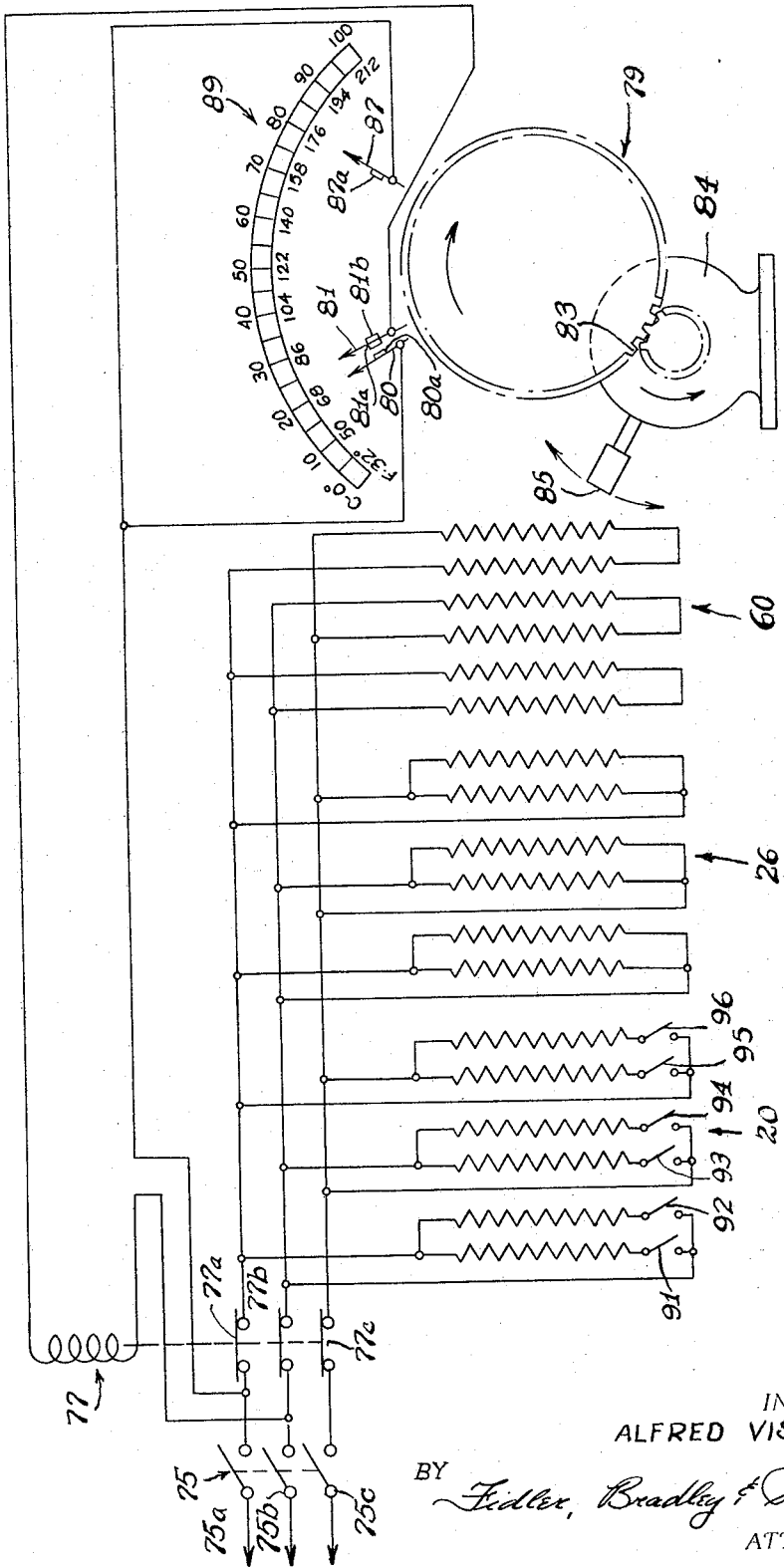

United States Patent Office 3,294,548
Patented Dec. 27, 1966

3,294,548
METHOD OF COOKING FOOD
Alfred Vischer, Jr., Park Ridge, Ill., assignor of 2/30 percent each to William Vischer, Alfred Vischer, and Peter Vischer, 4/30 percent each to Walter W. Zitzewitz and Elmer K. Zitzewitz, 1/30 percent each to Gertrude J. Zitzewitz and Barbara O. Zitzewitz, and 2/30 percent to Gertrude V. Bouton
Filed Sept. 14, 1964, Ser. No. 398,147
5 Claims. (Cl. 99—107)

This is a continuation-in-part of copending application, Serial No. 363,123, filed April 28, 1964, and now abandoned.

The present invention is particularly concerned with a new and improved roasting oven and a new and improved method of roasting, which method may be carried out in the apparatus embodying the present invention.

As might be expected, roasting ovens using forcibly circulated unsaturated steam or relatively dry heated air provide less shrinkage than do the more conventional roasting ovens and processes wherein no means for forcibly circulating the gaseous cooking medium over the food is employed. Since a circulating heat transfer medium has a much greater heat transfer characteristic than does a relatively stationary heat transfer medium, an important advantage of the forced air and forced unsaturated steam type ovens is that they can be operated at substantially lower temperatures while raising the temperature of the food to a predetermined value in a reasonable length of time.

Roasting ovens employing forcibly circulated, unsaturated steam have been operated at a temperature of the order of 200 degrees F. to cook four-pound chunks of commercial grade beef to the well-done state in approximately three hours. A mixture of air and steam having approximately 95 percent saturation results in an increased yield with commercial grades of beef in the order of 15 percent, and the resulting product has a higher quality than meats roasted at substantially higher temperatures in more conventional types of ovens. Because such a heat transfer medium is 5 percent air, the outside surface of the meat is sufficiently oxidized during the cooking process to have the general appearance, texture, color and flavor of meats roasted in conventional ovens.

When operating ovens of the forcibly circulated air or unsaturated steam type, the prior art procedure has been to preheat the oven to a predetermined temperature of, for example, 200 degrees F. After the oven has been preheated, the food to be cooked is placed in it and heat is supplied to the oven under the control of a thermostat which maintains the temperature in the oven at approximately that value to which it is initially set. For example, using unsaturated steam as the heating medium, the oven would be operated at 200 degrees F. to cook the food product to a state where it has an internal temperature of approximately 172 degrees F. In the case of an electric or gas oven, for example, the prior art procedure is to energize the heating unit until the temperature in the cooking compartment reaches say 200 degrees F. at which time the thermostat deenergizes the heating coils and maintains them deenergized until the temperature in the cooking compartment falls to a predetermined lesser level such, for example, as 195 degrees F. When the temperature falls to this lower predetermined level, the thermostate again energizes the heating unit to heat the compartment to 200 degrees F. The system thus continues to cycle between 195 degrees F. and 200 degrees F. until the food in the oven has been roasted the desired amount and the internal temperature thereof has reached 172 degrees F. or some other degree of doneness.

I have found that a substantially greater yield or reduced shrinkage may be obtained in this general type of roasting process employing forcibly circulated, unsaturated steam if heat is supplied to the cooking compartment only at the appproximate rate at which it is absorbed by the food during cooking. Accordingly, no cycling of the heating unit occurs and, for example, in the case of an electric oven, the heating elements are continuously energized throughout the entire cooking process. By maintaining the temperature in the cooking compartment throughout the cooking cycle in a forcibly circulated, unsaturated steam type cooker at a level no greater than between 8 and 12 degrees F. above the temperature of commercial grades of meats, I have obtained a yield of 80 percent when cooking such grades of meat to the well-done condition. Significantly, the total time required to cook the meat to a predetermined internal temperature in accordance with my invention is substantially the same as the time required where the temperature in the cooking compartment is maintained at a relatively high fixed value. The reason for this similarity in cooking times is more fully explained hereinafter in the body of the specification.

In addition to the much higher yields achieved by my new cooking method and apparatus, several additional advantages are obtained. For example, the cooked gristle has the consistency of gelatin and being very tender need not be cut away; the meat can be cut much more easily in that the edges do not tend to crumble and hence the meat may be cut into thinner slices; and when the meat is silced, the fat falls away of its own accord, whereby no separate trimming operation is required. An added advantage obtained by the employment of my new cooking method and apparatus is that the shrinkage during cooling is reduced by about 50 percent from that which occurs when meat is roasted by conventional methods.

Still another important advantage of my new cooking method is that the food to be cooked can be placed in the cooking department in the frozen state and will slowly thaw out without being damaged. Obviously, frozen food cannot be thawed in a high temperature oven inasmuch as the outer portions thereof will be cooked while the inner portions remain frozen. This is not so in the cooking process of my present invention.

Therefore, a principal object of the present invention is to provide a new and improved process for cooking.

Another object of the present invention is to provide a new and improved apparatus for cooking.

A further object of the present invention is to provide a new and improved cooking process which reduces the shrinkage which occurs both during cooking and later during cooling of the cooked food product.

A still further object of the present invention is to provide a new and improved apparatus for carrying out the cooking process of the present invention.

Briefly, the above and further objects are realized in accordance with the present invention by providing a cooking compartment and means for forcibly circulating a mixture of heated air and steam across the food being cooked while maintaining the temperature of the air or vapor at a relatively low, predetermined temperature differential greater than the temperature of the food to be cooked. In accordance with the cooking method of the present invention, heat is supplied to the cooking compartment at a rate approaching, but no greater than, the maximum rate at which the food can absorb it. In order to facilitate the transfer of heat to the food at this desired rate, another feature of this invention provides a timer controlled heater for the air-steam mixture which prevents the air-steam temperature from increasing at a rate exceeding that set by the timer.

Further objects and advantages and a better understanding of the present invention may be had by reference to the following detailed description taken in connection with the accompanying drawings wherein:

FIG. 1 is a vertical sectional view of an oven embodying the present invention;

FIG. 2 is a sectional view taken along the line 2—2 of FIG. 1 assuming the entire device to be shown therein;

FIG. 3 is a sectional view taken along the line 3—3 of FIG. 2 assuming the entire device to be shown therein;

FIG. 4 is a top view of a drip pan employed in the apparatus of FIG. 1;

FIG. 5 is a graph useful in understanding the present invention;

FIG. 7 is a schematic diagram of a control system embodying the present invention.

Figure 6:
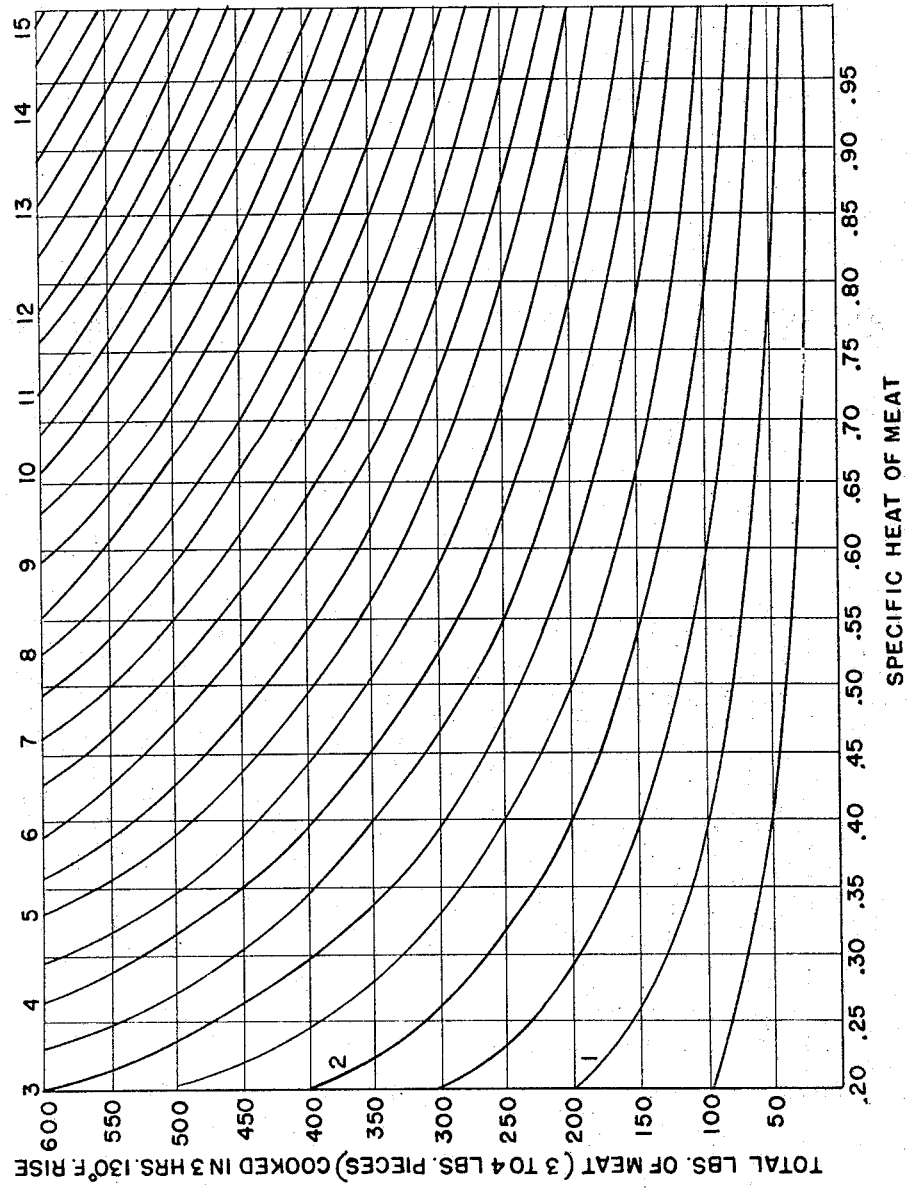
FIG. 6 is another graph illustrating the power required to cook various quantities and types of meat to various final temperatures in a predetermined time.

Before considering the cooking process and apparatus of the present invention an understanding of the several factors involved in the cooking of food, and more particularly meat, will facilitate an understanding of the apparatus and method of the present invention.

Food cooks by absorbing heat, and therefore, heat must be supplied to it. This is commonly done by boiling, broiling, frying or roasting. Broiling and roasting are perhaps the oldest known methods of cooking food and they have changed very little since the beginning of recorded history. Air is the primary heat transfer medium in roasting in spite of its extremely poor heat transfer characteristics. While boiling is a far superior method of transferring heat to the food it is not a generally satisfactory method of cooking meat because of the tendency to leach out the juices and give the meat a gray color. Broiling, on the other hand, results in substantial shrinkage and the color of the cooked product varies appreciably from the surface to the core. Roasting causes less shrinkage than broiling and is, therefore, one of the most widely used cooking processes for meat because of the desirable color, taste and texture of the cooked product.

In all types of cooking a calculatable amount of heat must be transferred to the product in order to raise its temperature to the desired value. In the case of "well-done" beef, for example, the final temperature may be of the order of 175 degrees F. The amount of heat which must be transferred to a given quantity of meat to raise it to a given temperature is directly related to the product of the weight of the meat and the specific heat of the meat itself. Very lean meats may have a specific heat of the order of 0.9 B.t.u. per pound per degree Fahrenheit, while commercial grades of meat which are quite fatty have a specific heat of approximately 0.5 B.t.u. per pound per degree Fahrenheit. Accordingly, the specific heat of the meat being cooked is an important factor in the amount of heat which must be transferred thereto in order to raise its temperature to the desired value. Another important factor affecting the time required to bring the product up to the desired temperature is the heat transfer characteristic of the meat itself. This characteristic is dependent upon the shape of the product and upon the coefficient of conduction of the product. Inasmuch as the fatty portions have a much lower coefficient of conduction than do the lean portions, lean meats cook much faster than fatty meats. In both cases there is a definite heat transfer characteristic which governs the rate at which heat can be transferred from the outer portion of the meat to the center portion to raise the internal temperature to the desired value.

I have found that the temperature differential between the inside and outside of the meat has very little effect on the heat transfer characteristic or on the time required to heat the inner portions of the meat to the desired temperature value. Since the inner portion or core of a chunk of meat can accept heat only at the rate at which it is transferred thereto from the outer portions of the meat, the application of high temperatures to the outer surface of the meat merely results in boiling away the water from the outer layer, thus causing the outside layer to be dry, hard and crusty. Moreover, the tissues in the outer portion become tough.

The cooking medium is another important factor in transferring heat to the meat. More particularly, the heat transfer coefficient of the cooking medium is important. As noted above, air has a very low heat transfer coefficient as compared, for example, to steam. Hence, if dry air at a given temperature is used as the cooking medium it will transfer heat to the food at a much lower rate than would steam at the same given temperature. It thus becomes desirable to employ a cooking medium having a high heat transfer coefficient rather than a cooking medium such as air, which has a very low heat transfer coefficient.

The present invention takes into account all of the above discussed factors to provide a highly efficient apparatus and method for supplying heat to a food being cooked.

Referring now to the drawings and more particularly to FIGS. 1, 2 and 3, there is shown a cooking unit 10 embodying the present invention and comprising a housing 12 mounted on four legs 13. The housing 12 includes a bottom wall 12a, a top wall 12b, a rear wall 12c and a pair of side walls 12d and 12e defining a roasting chamber or oven. A hinged door 17 is sealably positioned over an access opening 15 at the front. The walls of the housing 12 and the door 17 are all doubled wall elements having therein a suitable heat insulating material 18 such, for example, as glass wool. Part way up from the bottom of the housing 12 there is a partition 19 welded to the housing walls and a plurality of U-shaped immersible electrical heating units 20, such as the well-known calrod units, are mounted in a tray-like depending portion 21 of the partition 19. Suitable means, not shown, are provided for supplying water 23 to the tray 21 and maintaining the water at a level somewhat above the heating elements 20. A plurality of shoulder bolts 22 extend forwardly from the rear wall 12c and apertures in a rear panel member 24 are positioned over the reduced end portions of the bolts 22, thereby to provide an open space of substantial depth at the rear of the cooking compartment. In this space a plurality of U-shaped electric heating coils 26 depend about three-quarters of the way down from the top. Across the top of the housing 12 in spaced apart relationship with the top wall 12b is mounted a partition 28 having a circular opening 30 near the front end thereof. An electric motor 32 is supported on top of the housing 12 and drives a centrifugal blower disposed above the opening 30 so that when the motor 32 is energized the blower 36 circulates air from the cooking compartment, around through the space above the partition 28 and down behind the inner wall around the rear heating elements 26. The heated air then passes under the lower edge 24a of the rear partition 24 and across the surface of the heated water 23 contained in the tray 21. As explained more fully hereinafter, in accordance with one aspect of this invention the heating elements 20 are continuously energized throughout the cooking cycle to heat the water in the tray 21.

In order to support trays in the roasting compartment and in order to hold the rear partition 24 in place on the shoulder bolts 22, two racks 38 and 39 are respectively mounted on the inside of the walls 12d and 12e. The rack 39 comprises a pair of vertical members 40 having welded thereto a plurality of horizontally disposed angle irons which form tracks 41, 42, 43, 44, 45, 46 and 47. As best shown in FIG. 1, the alternate ones of the tracks designated 42, 44 and 46 are positioned on the uprights 40 so as to be in engagement with the rear partition 24 when the rack 38 is hung on a plurality of headed studs 49 which extend from the side wall 12d. The partition 24 is thus held in abutment with the shoulders on the bolts 22. Four such studs 49 are provided and correspondingly positioned key-hole slots are punched in the member 40 to facilitate removal of the racks for cleaning and the like.

The rack 38 is the mirror image of the rack 39 and therefore need not be described in detail herein. For convenience, however, the parts thereof corresponding to those of the rack 38 are identified by identical reference numerals with a suffix *a* added thereto. The tracks 41, 43, 45 and 47 and the corresponding tracks 41*a*, 43*a*, 45*a* and 47*a* are each provided with a rearwardly disposed, struck-up portion 48 so that when the trays 50 are placed thereon those trays which are supported by tracks 41, 41*a*; 43, 43*a*; 45, 45*a*; and 47, 47*a* are spaced a substantial distance from the panel 24 and the forward edges thereof are closely disposed with respect to the inner wall of the door 17 when it is in the closed position as shown in FIG. 1.

As the vaporous mixture of heated air and steam passes upwardly through the roasting compartment it follows a generally tortuous path traveling in rearward direction under the tray on the tracks 47, 47*a*, in a forward direction under the tray on the tracks 46, 46*a*, in a rearward direction under the tray on the tracks 45, 45*a* and so on, until it reaches the top and is forced down behind the panel 24 by the blower 36. The air-steam vapor mixture thus passes directly over and around the food on the trays.

In order to permit the drippings from the meat supported by the trays 50 to fall to the bottom of the roasting compartment and to provide for better circulation of steam and air around the meat, each of the trays 50 is perforated over the entire bottom surface as best indicated in FIG. 3. A drip pan 52 is supported on a pair of tracks 53 and 53*a*. The tray 52 is imperforate so that the drippings are collected by this tray and prevented from falling into the water in the water tray 21. As shown best in FIG. 1, the drip tray 52 is spaced from the door 17 so that the mixture of air and steam passing over the water in the tray 21 passes upwardly between the forward end of the tray 52 and the door 17 and then passes rearwardly under the lower-most one of the meat trays 50. In order to facilitate draining and cleaning of the drip pan 52, it is provided with a removable drain plug 54 conveniently located at the forward end thereof so as to be accessible without removal of the pan 52 from the compartment.

The space provided in the unit beneath the partition 19 may house various pieces of control equipment (not shown) such, for example, as a float operated valve for maintaining the level of water in the tray 21 at a predetermined level.

As the cooking cycle progresses the outer portions of the meat are the first to be heated and the volume of unheated food therefore decreases. Accordingly, the amount of energy required to be added to the system during the cooking cycle progressively decreases during the cooking operation.

Means responsive to the temperature differential between the meat and the cooking medium may be employed to control the amount of heat being given off by the heating coils 20 and 26 in order to maintain a constant temperature differential between the air-steam mixture and the meat throughout the cooking cycle. Also a standard or reference material having approximately the specified heat and transfer characteristics of the meat being cooked may be placed in the oven and the temperature differential between such reference material and the air-steam mixture may be measured and used to control the current to the heating elements. However, the air-steam temperature may be more easily regulated and such control means may be eliminated by computing the amount of heat which is required to cook the quantity of meat contained in the roasting compartment and initially adjusting the amount of heat supplied to the heating medium by the heating coils 20 and 26 to provide such energy.

Inasmuch as the temperature differential between the air-steam heating medium and the meat is relatively low, where large quantities of meat are being cooked, supplemental means must be provided for adding heat to the air-steam medium as it traverses the tortuous paths through the oven. To this end, a plurality of heating units 60 are mounted on the door 17 opposite the rearwardly positioned tracks 42, 44 and 46. Each of the units 60 comprises a pair of electric heating elements. In a preferred embodiment of this invention the elements in each of the units 60 are connected together in series across one phase of a three-phase power system. It will be understood that the combined heat energy developed by the units 60, the elements 20 and the elements 26 is the heat supplied to the meat plus the heat which escapes from the system. This total heat energy should not exceed that required to maintain the temperature differential between the air-steam heating medium and the meat within the heretofore discussed temperature range.

Referring to FIG. 6 there is shown a family of curves which indicates the power required to be added to the system in order to cook meat which is at an initial temperature of, for example, 40 degrees F. to a well-done temperature of 170 degrees F. in three hours. More particularly, these graphs indicate the amount of energy required to be supplied to the system in order to raise the temperature of different types and quantities of meat 130 degrees F. in three hours. These curves have been computed on the basis of 50 percent efficiency in the operation of the system cooking compartment.

Consider now a typical cooking cycle using the cooker 10 to practice the method of the present invention. The food to be roasted is assumed to be a commercial grade of beef having a specific heat of 0.7 B.t.u./lb./degree F. Five hundred pounds in relatively large chunks of about three or four pounds each is spatially arranged in the trays 50 and a sufficient number of the heating units 26 are energized or all of them are energized with a sufficient electric current, and the heating coils 20 are similarly energized so that the amount of heat added to the system by these two sets of heating units is just sufficient to maintain a temperature differential between the chunks of meat and the air and steam mixture in a range between 8 and 12 degrees F. Referring to FIG. 6 it will be seen that the power input to the heating units should be about 8.75 kilowatts. If the energy supplied to the air and water is in excess of this amount the temperature in the cooking compartment will increase at a rate greater than that of the meat thereby impairing the cooking process. It is important that the 8 to 12 degrees F. temperature differential not be exceeded throughout the entire cooking cycle and it is preferable that the temperature differential slowly decrease during the cycle so that the cooking medium and the meat have approximately the same temperature when the meat reaches the desired degree of doneness.

I have determined by experiment that satisfactory results are achieved where the temperature differential between the cooking medium and the meat varies from about 10 degrees F. at the start to zero degrees at the termination of a cooking cycle where the meat is at a temperature of 40 degrees F. at the beginning of the cooking operation and is done at an internal temperature of 165 degrees F.

FIG. 5 is a graph showing the temperatures of the meat and the cooking medium during a typical cooking cycle wherein 580 pounds of fresh beef were roasted to a final internal temperature of 165 degrees F. The solid line shows the temperature of the heating medium. The dotted line shows the temperature of the beef throughout the cooking operation.

In order to maintain the correct balance between the amount of heat added to the system by way of the heating elements 20, 26 and 60, it should be understood that the purpose of the heating elements 20 is primarily to heat the water in the tray 21 in order to add steam to the heating medium for transference to the meat being cooked. To accomplish this, I have found that the heating elements 20 should be energized by an amount just sufficient to maintain the temperature of the air-steam mixture at about 10 degrees F. above the temperature of the meat. In other words, the water need not be boiled in order to provide a satisfactory heat transfer medium. At the start of the cooking cycle the percentage of steam in the cooking medium is relatively low and increases to a maximum value at the end of the cycle as the temperature of the cooking medium increases. The result is that heat is transferred to the meat at a rate at which it can be absorbed. Accordingly, at the end of the cycle the meat is cooked almost the same amount throughout, i.e., the color, texture and taste are uniform from a point close to the outer layer to the center. Because of the air in the cooking medium, a very thin outer layer is roasted and has the characteristic dark color of roasted meat, oxidation having taken place.

Referring now to FIG. 7 there is illustrated in simplified schematic form a control circuit for energizing the heating elements 20, 26 and 60 to prevent the heat applied to the air-steam mixture from exceeding the rate at which the food is capable of absorbing it. Power from a three-phase A.C. system is supplied through respective sections 75a, 75b and 75c of a switch 75 to three sets of normally closed contacts 77a, 77b and 77c of a relay 77. The three sets of parallel heating elements 20, 26 and 60 are connected between the contacts 77a, 77b and 77c across the three-phases of the power system. The pairs of heating elements 60 are connected in series between the contacts 77a, 77b and 77c and thus across the three-phases of the power system. Accordingly, with the switch 75 closed, the heating elements 20, 26 and 60 are energized when the relay 77 is dropped out and deenergized when the relay 77 is picked up.

In order to insure that the temperature of the air-steam mixture increases no more than that of the food being cooked, there is provided a motor driven contact thermometer or thermostat 79 which controls the operation of the relay 77. As shown, the thermostat 79 includes a first pointer-like element 80 having a contact 80a electrically connected through one section of the switch 75 to one line of the power system, and a second pointer-like element 811 having a contact 81a electrically connected to one side of the coil of the relay 77. The other side of this relay coil is connected through another section of the switch 75 to another line of the power system. The element 80 may be a pointer and is moved by any suitable means along an arcuate path in a clockwise direction in response to an increase in temperature of the heating medium. The element 80 is thus angularly positioned in response to and in accordance with the temperature of the air-steam mixture.

The element 81 is also movable along an arcuate path in a clockwise direction and is thereby driven through suitable gearing 83 by a motor and reduction gear box unit 84. The speed of the output shaft of the unit 84 is adjustable by a lever 85, which should be positioned such that the element 81 moves at a rate proportional to the rate at which the food being cooked can absorb heat. For commercial grades of beef a rate corresponding to 20 degrees C. per hour has been found to be proper. Should the air-steam temperature rise exceed this rate, the contacts 80a and 81a on the elements 80 and 81 will mutually engage. Hence, the relay 77 will pick up and the heating elements 20, 26 and 60 will be deenergized. The air-steam temperature rise is, therefore, limited by the speed at which the element 81 is driven.

A third element 87 is provided as a safety element and supports a contact 87a to be engaged by a second contact 81b on the element 81 when the cooking cycle is completed. The contact 87a on the element 87 is electrically connected to the contact 80a so that when the contacts 81a and 87a are mutually engaged, the relay 77 is picked up and deenergizes the heating elements 20, 26 and 60 permanently because the cooking cycle is completed.

A graduated temperature indicating dial 89 may be provided so that the element 80 provides a visual indication of the temperature of the air-steam mixture in the cooking chamber.

In order to permit adjustment of the rate at which heat is supplied to the oven, a plurality of switches 91 through 96, inclusive, are respectively connected in series with the heating elements in the unit 20. As shown, two heating elements are adapted to be connected across each phase of the power system but it will be understood that additional elements may be provided to enable more accurate control of the heat energy supplied to the oven. Preferably, the individual heating elements for each phase should have different resistance values thereby enabling a still greater control. For example, one element in each set may have a rating of 660 watts and the other a rating of 1320 watts. Where four heating elements are provided for each phase, two elements having a rating of 660 watts and two elements having a rating of 1320 watts have been found to enable a wide range of control. Accordingly, the same oven may be used for roasting low conductivity meat such as beef and high conductivity meat such as chicken, both at the optimum levels to insure maximum yield in the final product.

It will be understood that similar switches can be connected in series with the respective heating elements in the other sets of heating elements 26 and 60 to provide added control if required. Moreover, by providing the selector switches 91–96 the motor driven thermostat arrangement can be eliminated since a proper adjustment of the heat energy being supplied to the system will maintain the rate of temperature rise in the oven at approximately the rate of temperature rise in the product being cooked. In such an installation the motor 84 and the element 81 are omitted.

While the present invention has been described in connection with different embodiments thereof, it will be understood that those skilled in the art may make many changes and modifications without departing from the invention and, therefore, it is intended by the appended claims to cover all changes and modifications which come within the true spirit and scope of the invention.

I claim:
1. A method of cooking food comprising the steps of placing the food to be cooked in a confined space, supplying a mixture of steam and air to said space, circulating said mixture in said space around said food, and continuously applying heat to said mixture to maintain the temperature in said space at a predetermined temperature differential approximately 8–12° F. above the temperature of said food during the cooking process.

2. A method of cooking meat comprising the steps of placing the meat to be cooked in a confined space, circulating a heat transfer medium comprising steam and air in said space around said food, and supplying heat to said space and to said food to maintain the temperature of said medium at a predetermined temperature differential approximately 8–12° F. above the temperature of said food.

3. A method of applying heat to a product so as to raise the temperature throughout the product to a predetermined value without substantially overheating the external portions thereof, comprising the steps of placing the product in a confined space, supplying a gaseous heat transfer medium to said space, and continuously applying heat to said medium at a rate approximating the rate at which heat is absorbable by the product to maintain the temperature of said medium in said space within a predetermined temperature differential of approximately 8 to 12° F. during the heating operation.

4. A method of roasting meat comprising the steps of placing a plurality of relatively uniform pieces of meat in a confined space, supplying a mixture of steam and air to said space, circulating said mixture around said meat, and applying heat to said mixture to maintain the temperature of said mixture within a predetermined temperature differential range of about 8 to 12° F. to cause the temperatures of both the mixture and the meat to continually increase throughout the roasting process.

5. A method of cooking food by raising the temperature thereof to a value exceeding 100° F., comprising the steps of, circulating unsaturated steam around the food and gradually increasing the temperature and the degree of saturation of the steam until the temperature of the food is at a desired value while maintaining the temperature differential between said steam and said food within the range of about 8 to 12° F.

References Cited by the Examiner

UNITED STATES PATENTS

| | | | |
|---|---|---|---|
| 1,955,289 | 4/1934 | Greenfield | 99—107 |
| 2,138,813 | 12/1938 | Bemis | 99—352 |
| 2,199,584 | 5/1940 | Bemis | 99—107 |
| 2,238,309 | 4/1941 | Cramer | 99—386 |
| 2,331,266 | 10/1943 | Cramer | 99—107 |
| 2,574,950 | 11/1951 | Ben-Dor | 126—369 |

FOREIGN PATENTS 522,007   10/1955   Belgium.

A. LOUIS MONACELL, *Primary Examiner.*

HYMAN LORD, *Examiner.*